United States Patent
Lee et al.

(10) Patent No.: US 10,185,036 B2
(45) Date of Patent: Jan. 22, 2019

(54) RECEIVER PERFORMANCE USING GNSS SIGNALS HAVING DIFFERENT FREQUENCIES

(71) Applicant: iPosi, Inc., Denver, CO (US)

(72) Inventors: Richard M. Lee, Denver, CO (US); Eric Derbez, Vancouver (CA); Christopher Neil Kurby, Stramwood, IL (US)

(73) Assignee: iPosi, Inc., Denver, CO (US)

( * ) Notice: Subject to any disclaimer, the term of this patent is extended or adjusted under 35 U.S.C. 154(b) by 0 days.

(21) Appl. No.: 15/932,260

(22) Filed: Feb. 16, 2018

(65) Prior Publication Data

US 2018/0284289 A1   Oct. 4, 2018

Related U.S. Application Data

(60) Provisional application No. 62/459,707, filed on Feb. 16, 2017.

(51) Int. Cl.
*G01S 19/23* (2010.01)
*G01S 19/25* (2010.01)
*G01S 19/30* (2010.01)

(52) U.S. Cl.
CPC .............. *G01S 19/30* (2013.01); *G01S 19/23* (2013.01); *G01S 19/256* (2013.01)

(58) Field of Classification Search
CPC ......... G01S 19/30; G01S 19/23; G01S 19/256
USPC ...................................... 342/357.69
See application file for complete search history.

(56) References Cited

U.S. PATENT DOCUMENTS

| | | | |
|---|---|---|---|
| 6,888,879 B1* | 5/2005 | Lennen | G01S 19/24 342/135 |
| 2009/0161749 A1* | 6/2009 | Nangia | H04L 5/0007 375/233 |
| 2014/0093008 A1* | 4/2014 | Jong | H03M 13/1515 375/284 |

OTHER PUBLICATIONS

J.M Sleewaegen, "Theoretically correct decimation of GPS data", Geophysical Research Letters, vol. 26, No. 24, pp. 3713-3716, Dec. 15, 1999 (Year: 1999).*

* cited by examiner

*Primary Examiner* — Frank J McGue
(74) *Attorney, Agent, or Firm* — Marsh Fischmann & Breyfogle LLP

(57) ABSTRACT

Data bandwidth reduction in positioning system signals. Specifically, a first, relatively easily acquired signal may be analyzed to determine if and/or to what extent to decimate a second signal. The second signal may comprise a higher encoded data rate (e.g., a chip rate). In turn, decimation of the second signal based on characteristics of the first signal may allow for more efficient processing of the second signal.

20 Claims, 4 Drawing Sheets

RECEIVER PERFORMANCE USING GNSS SIGNALS HAVING DIFFERENT FREQUENCIES

RELATED APPLICATIONS

This application is a non-provisional of U.S. Application No. 62/459,707 entitled "RECEIVER PERFORMANCE USING GNSS SIGNALS HAVING DIFFERENT FREQUENCIES", which was filed on Feb. 16, 2017, the entirety of which is incorporated by reference herein.

FIELD

The present application relates to processing of positioning system signals, namely processing of Global Navigation Satellite System (GNSS) signals such as Global Positioning System (GPS) signals or the like.

BACKGROUND

Global satellite navigation fulfills many pervasive needs. Initially a service for military and general aviation, the use of satellite navigation systems continues to expand into many commercial and consumer products for applications ranging from casual applications to emergency services. The preponderance of GNSS is enabled by GPS that is managed by the United States Air Force. GPS is now or may soon be joined by several additional GNSS systems including: Glonass (Russia), Galileo (European Space Agency), BeiDou Navigation Satellite System (China), and QZSS (Japan).

Many electronic devices, including mobile computing devices (e.g., tablets, phones, laptops, etc.), have been developed that leverage GNSS capabilities to facilitate location-based services and/or emergency caller location services in response to government requirements. Furthermore, small cell radio access nodes currently provide, or will in the future provide, necessary infrastructure for wireless services. For instance, it has been contemplated that fifth-generation mobile networks (i.e., 5G networks) will utilize small cells to provide continuous or near continuous 5G coverage, especially in urban areas. Such small cells are envisioned to provide more efficient provisioning of spectrum to users of mobile computing devices and enable data reception in virtually all environments. Accurately determining the location of such small cells will become critical to the operation thereof. As such, it is contemplated that small cells will incorporate GNSS technologies for use in locating the small cells in connection with provision of wireless services such as data communication, voice communication, and the like.

Regardless of the specific context in which GNSS services are utilized, it may be that a receiver may have difficulty in acquiring sufficient positioning system signals to determine a location of the receiver. A number of conditions may exist that present such difficulty. Such conditions may limit the number of signals that may be acquired and/or the strength of such signals. For instance, often times a receiver may be located within (i.e., imbedded within) a building. Such receivers that are imbedded within a building may experience high attenuation of signals as signals must pass through the building materials surrounding the receiver. Furthermore, such in-building or imbedded receivers may be located in highly urbanized areas. In such contexts, in addition to high attenuation of positioning system signals, the signals may also experience multipath propagation of signals and/or experience reflection of signals, among other conditions in the urban environment that make signal acquisition difficult.

Moreover, as the use of positioning system receivers in computing devices continues to become more pervasive, a number of difficulties are presented in relation to the computational capacity of such receivers. For instance, traditional approaches to overcoming difficulties in signal acquisition have included use of so-called "high sensitivity" receivers. Such receivers typically utilize powerful processing to assist in acquiring signals that are difficult to discern. Further still, introduction of new positioning system signals with higher encoded data rates (e.g., chip rates or the like) may increase the processing complexity required of receivers to determine a location of a receiver. Accordingly, such high precision receivers may be impractical or infeasible for in certain contexts, such as small cell receivers or mobile devices where computing capacity may be limited due to size, price, and/or energy consumption constraints. In turn, receipt of positioning system signals in an efficient manner that allows for acquisition of difficult signals continues to be a pervasive need.

SUMMARY

Accordingly, the present disclosure relates to improved GNSS signal processing that may provide more efficient operations of receivers. For instance, using the disclosure provided herein, a receiver may more efficiently use the computational capacity of the receiver to process positioning signal system. Additionally or alternatively, transmission of data corresponding to positioning signals received at the receiver (e.g., for remote processing of the data) may require less network bandwidth to transmit. In either of the foregoing regards, the present disclosure facilitates reduction in the data bandwidth required to process the positioning system signals. In this regard, data bandwidth may refer to the computational capacity required to process the positioning system signal data locally or the network bandwidth required to transmit the positioning system signal data. Specifically, the present disclosure contemplates use of a plurality of positioning signals with different frequencies and/or signal codes to facilitate more efficient processing of at least one of the position signals.

For instance, at least one of the positioning signals may be a relatively difficult signal to process due to, for example, an increased encoded data rate (e.g., a chip rate or the like). In traditional GPS processing, this signal may be more computationally intensive to process at a receiver. As such, such a signal may be more difficult to acquire. However, a relatively more easily processed first signal (e.g. a positioning signal with a lower encoded data rate) may be acquired and analyzed. In an embodiment, characteristics regarding the first, relatively easily acquired signal may be used as a basis for when to decimate a second signal that may be more difficult to acquire. For instance, a threshold may be established such that when the characteristics of the first signal exceed the threshold, the second signal may be decimated to reduce the data bandwidth of the second signal. The threshold may comprise a threshold curve or threshold function that may be dependent on a plurality of first signal characteristics.

For instance, the threshold curve to which the first signal is compared may be at least in part based on a signal to noise ratio (SNR) of the first signal. As the first signal and the second signal may be sent from a common positioning system transmitter (e.g., a common space vehicle), a high SNR for the first signal may indicate that the second signal may have a similarly high SNR. Given a high SNR for the second signal, it may be that the second signal may be more reliably decimated without undue degradation of the results of processing the second signal. In further embodiments, other characteristics regarding the first signal may be used to determine whether to decimate data received in connection with the second signal that may include, for example, the radio frequency (RF) power of the first signal and/or the number of non-coherent integrations performed to receive the first signal.

Accordingly, a first aspect includes a method for processing signals received at a receiver capable of receiving signals broadcast from a positioning system transmitter. The method includes receiving first code signal data belonging to a first code signal at the receiver. The method also includes determining a signal to noise ratio (SNR) for the first code signal data received at the receiver and comparing the SNR for the first code signal to an SNR threshold value. In turn, the method includes receiving second code signal data belonging to a second code signal at the receiver. The method includes selecting a decimation level based on the comparison of the SNR for the first code signal to the SNR threshold value and applying the decimation level to the second code signal data to generate decimated second code signal data. A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in some embodiments the decimation level may reduce the data rate of the second code signal data when the SNR for the first code signal data is greater than the SNR threshold value. In contrast, the decimation level may not reduce the data rate of the second code signal data when the SNR for the first code signal is less than the SNR threshold value.

In some embodiments, the SNR threshold value is at least in part based on the SNR and a measured power value of the first code signal data. As such, the method may further include non-coherently integrating the first code signal data at the receiver over a number of non-coherent integrations, and the SNR threshold value may be at least in part based on the number of non-coherent integrations. Furthermore, the method may include that the non-coherently integrating is repeated until the SNR threshold value is reached.

In some embodiments, the applying may include decimating a given number of data portions of the second code signal data. For example, the data portions may correspond to a given period of data received at the receiver. Specifically, the given period of data may correspond to a coherent integration period for the receiver.

In some embodiments, the first code signal data and second code signal data may be broadcast from a common positioning system transmitter. The first code signal data and the second code signal date may be broadcast from a GNSS space vehicle. In some applications an encoded data rate (e.g., chip rate) of the second code signal may be greater than the first signal. The first code signal data belonging to the first code signal may be broadcast on a first frequency, and the second code signal data belonging to the second code signal may be broadcast on a second frequency. In certain applications, the first code signal data may correspond to an L1 signal of the GNSS space vehicle and the second code signal data may correspond to an L5 signal of the GNSS space vehicle.

In some embodiments, the method may include calculating a position of the receiver at least in part based on the decimated second code signal data. The method may also include transmitting the decimated second code signal data to a remote processor for calculation of a position of the receiver at least in part based on the decimated second code signal.

A second aspect includes an apparatus for receipt and processing of positioning system signals. The apparatus includes a receiver for receipt of first code signal data belonging to a first code signal and second code signal data. The apparatus also includes a memory that stores a signal to noise ratio (SNR) threshold value. The apparatus further includes a processor in operative communication with the receiver, where the processor is operative to calculate a signal to noise ratio (SNR) for the first code signal data and compare the SNR for the first code signal data to the SNR threshold value stored in the memory. The apparatus also includes a decimator that is operative to decimate the second code signal data based on the comparison of the SNR for the first code signal data to the SNR threshold to generate decimated second code signal data.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, the decimator may reduce the data rate of the second code signal data when the SNR for the first code signal data is greater than the SNR threshold value. In contrast, the decimator may not reduce the data rate of the second code signal data when the SNR for the first code signal data is less than the SNR threshold value.

In some embodiments, the receiver is operative to measure a power value of the first code signal data received at the apparatus, and the SNR threshold value is at least in part based on the power value of the first code signal data. In addition, the apparatus may also include a non-coherent integration module operative to non-coherently integrate the first code signal data over a number of non-coherent integrations. In turn, the SNR threshold value may be at least in part based on the number of non-coherent integrations.

In some embodiments, the decimator may be operative to decimate a given number of data portions of the second code signal data. The data portions may correspond to a given period of data received at the receiver. For example, the given period of data corresponds to a coherent integration period for the receiver.

In some embodiments, the first code signal data and the second code signal data may be broadcast from a common positioning system transmitter. For instance, the first code signal data and the second code signal data may be broadcast from a GNSS space vehicle. In some applications, an encoded data rate (e.g., chip rate) of the second code signal is greater than the first signal. The first code signal data belonging to the first code signal may be broadcast at a first frequency, and the second code signal data belonging to the second code signal may be broadcast on a second frequency. For instance, the first code signal may correspond to an signal of the GNSS space vehicle and the second code signal data may correspond to an L5 signal of the GNSS space vehicle.

The apparatus may include a location determination module for calculating a position of the apparatus at least in part based on the decimated second code signal data. The apparatus may include a network interface device operative to transmit the decimated second code signal data to a remote location determination module for calculation of a position of the apparatus at least in part based on the decimated second code signal.

DETAILED DESCRIPTION

Figure 1:
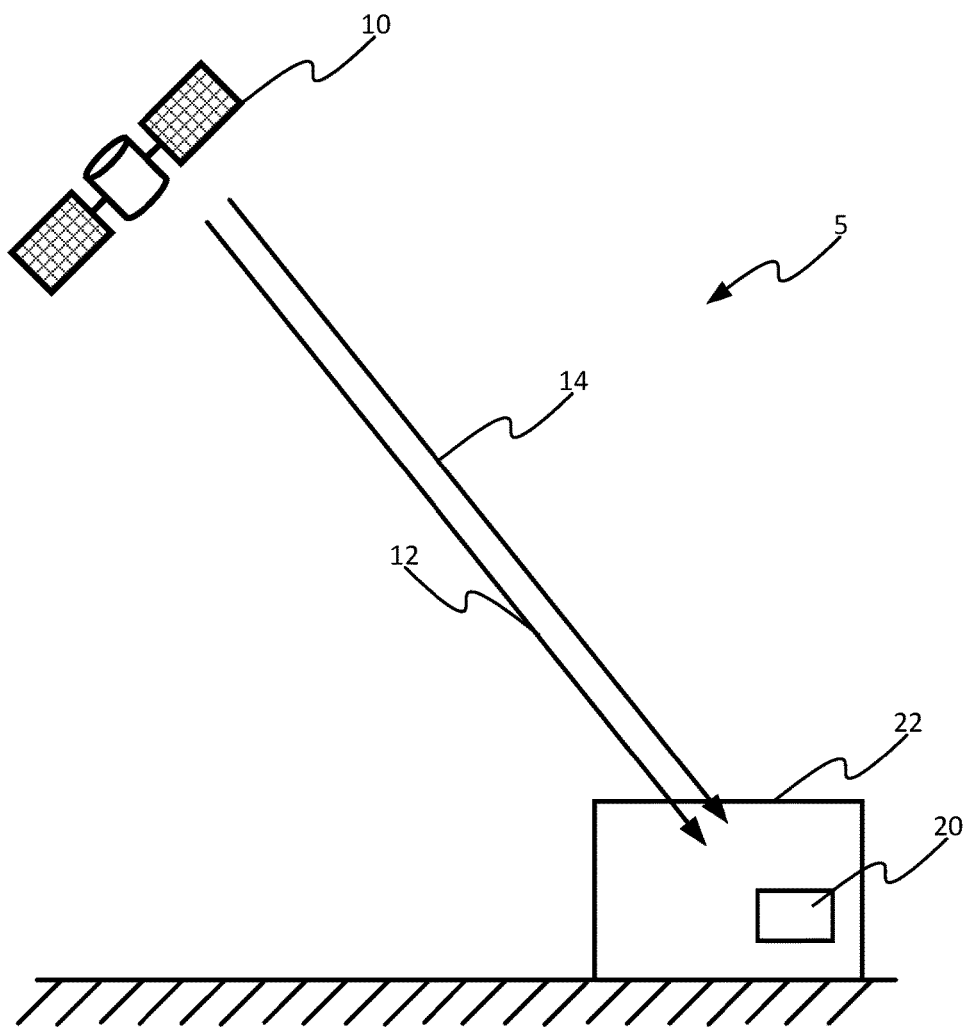
FIG. 1 depicts an embodiment of an environment for receipt of a plurality of positioning signals by a receiver.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

As described above, the present disclosure facilitates systems and methods related to improved signal acquisition at a receiver of positioning system signals (e.g., GPS signals or other GNSS signals). A first signal may be acquired and characteristics regarding the signal may be determined. The characteristics of the first signal may be intrinsic to the signal (e.g., the RF power of the signal at the receiver, a SNR of the signal at the receiver, etc.) or the characteristics of the first signal may relate to acquisition of the first signal (e.g., the number of non-coherent integrations performed to acquire the signal). In any regard, based on one or more of the characteristics of the first signal, a determination of whether to decimate a second signal at the receiver may be made. The second signal may be a signal with higher data bandwidth requirements than the first signal (e.g., the second signal may have a higher encoded data rate such as a chip rate or the like). In turn, the second signal may be more easily processed at the receiver or more easily transmitted over a data network to a remote location for processing.

With reference to FIG. 1, an environment 5 is depicted in which the present disclosure may be applicable. A positioning system transmitter 10 may be operative to broadcast positioning system signals. For instance, the positioning system transmitter 10 may be a GNSS space vehicle (e.g., a GPS satellite). However, other positioning system transmitters are contemplated such as aerial transmitters within the Earth's atmosphere or the like. For instance, manned or unmanned aerial vehicles may also be utilized as positioning system transmitters 10 without limitation.

A receiver 20 may be provided that is operative to receive positioning system signals 12, 14 that are broadcast from the positioning system transmitter 10. The receiver 20 may be, in at least some embodiments, imbedded within a building 22. In other contexts, the remote receiver 20 may be In a location that otherwise makes signal acquisition more difficult such as in an urban environment or the like. In at least some embodiments, the receiver 20 may be a stationary receiver. In this regard, the receiver may be a network device such as a router, switch, small cell, wireless access point, or the like. In other contexts, the receiver may be a VoIP phone, a desktop computer, a laptop computer, or other computing device. In this regard, while the device may be relatively mobile, the location of the receiver may be assumed to be stationary for purposes of the discussion provided herein.

A first code signal 12 and a second code signal 14 may be received at the receiver 20. The first signal and second signal may comprise different respective GNSS code signals. For instance, many GPS satellites either currently do, or may in the future, broadcast a plurality of code signals on different frequencies. These code signals may have different encoded data rates (e.g., a chip rate or the like). For instance, the first code signal or second code signal may comprise a coarse/acquisition (C/A) pseudorandom noise code, a civil-moderate (CM) code, a civil-long (CL) code, a navigation code, a military code (M-code), a precision code (P-code), an I5-code, and/or Q5-code. As may be appreciated, the first code signal 12 and the second code signal 14 may be broadcast from the same positioning system transmitter.

As an example, the first code signal 12 may be broadcast on an L1 band at a frequency of 1575.42 MHz by a positioning system transmitter 10. In an embodiment, the first code signal may be an L1 C/A signal. The second code signal 14 may be broadcast ton an L5 band at a frequency of 1176.45 MHz. In an embodiment, the second code signal may be an L5 I5-code and/or Q5-code.

In this example, the second code signal 14 on the L5 band may have a higher encoded data rate (e.g., chip rate) than the first signal 12. Specifically, the first signal 12 on the L1 band may comprise 1.023 megachips per second (Mchips/s), while the L5 signal may comprise 10.23 Mchips/s. In this regard, the L5 signal may require more intensive processing to acquire relative to the L1 signal with a lower encoded data rate. For instance, the L5 signal may require 7 to 10 times more data bandwidth than processing of the L1 signal. As described above, data bandwidth may correspond to network bandwidth used to transmit data corresponding to the signal to a remote location for processing or may refer to the processing requirements locally at the receiver to process the signal. Despite the difficulty in processing, the L5 signal may be advantageous to use because the L5 signal facilitates mitigation of local multi-path errors and may provide gain sensitivity.

Traditional approaches may include use of high powered processing capabilities (e.g., embodied in purpose built application specific integrated circuits (ASICs)). While such ASICs may be operative to acquire an L5 signal having a relatively high encoded data rate, the cost of such devices may be prohibitive in respect to both processing power and economic costs. In turn, utilizing such approaches, especially in the context of consumer devices or small cells, may be prohibitive. That is, using traditional approaches, it may be infeasible to process L5 signals using the host processor of a receiver for multiple SVs.

Accordingly, the present disclosure contemplates utilizing characteristics regarding a first signal to selectively control decimation of a second signal for more efficient processing of the second signal. Specifically, to reduce the data bandwidth required for processing of an L5 band signal such as I5-code or Q5-code data, a signal to noise ratio (SNR) of the L1 signal may be used to deduce the minimum effective data speed needed to effectively process L5 band signals by decimating the data regarding the L5 band signal. Again, by data bandwidth requirements, local processing and offloading (e.g., transmitting over a network for remote processing) of data is contemplated. For instance, for 1 second of L5 band data, with a sufficiently high SNR for the L1 band (e.g., a SNR value that exceeds a predetermined threshold), a receiver may decimate the 1 second of L5 band data and send each nth portion of a sample or portion of data (e.g., each 2nd or 3rd second portion of data in a continuous string of data). In this regard, any size of data portion may be used for decimation. For instance, individual data bits may be decimated or larger portions of data such as bytes may be decimated. Furthermore, the decimation may be based on epochs of data corresponding to various time periods. In this regard, a portion of data may correspond to a 1 ms group of data such that data in various 1 ms blocks of data may be decimated. Other time measures may be used such as 1 s blocks or any appropriate variation thereof. In any regard, a receiver may reduce the size of data string of a received signal (e.g., by block decimating the number of total bits locally) to send a continuous time-tagged lower data rate stream, which would require smaller data bandwidth.

In at least some embodiments, coherent integration of the first signal and/or the second signal may be employed when receiving the signal. It may be advantageous to use longest possible coherent integration period for both the first and second signal (e.g., at least about 1 sec). The longest possible coherent integration period may be determined based on characteristics of the receiver. For instance, the coherent integration period may be determined based on the local receiver oscillator stability and/or the accuracy of the Doppler prediction for the signals received at the receiver. Moreover, as will be described in greater detail below, the portions of data for decimation may be based on the coherent integration period. That is, if the longest possible coherent integration period is determined to be 1 second, the size of each portion of data may also be 1 second. As such, every other 1 second portion of data may be decimated. In other embodiments, other decimation values associated with different rates of decimation may also be used. In addition, non-coherent integration may be performed wherein data acquired during a plurality of coherent integration periods are non-coherently summed. For purposes of discussion, the number of "non-coherent integrations" may correspond to the number of coherent integration periods that are non-coherently summed. In this case, two non-coherent integrations may comprise non-coherent summing of two coherent integration periods.

The decimation of a second signal may be based on a detected SNR for a first signal. The SNR may be based on the carrier power of the first signal relative to the noise power spectral density of the first signal. In addition, the decimation level may be at least partially based on the RF power of the first signal.

Figure 2:
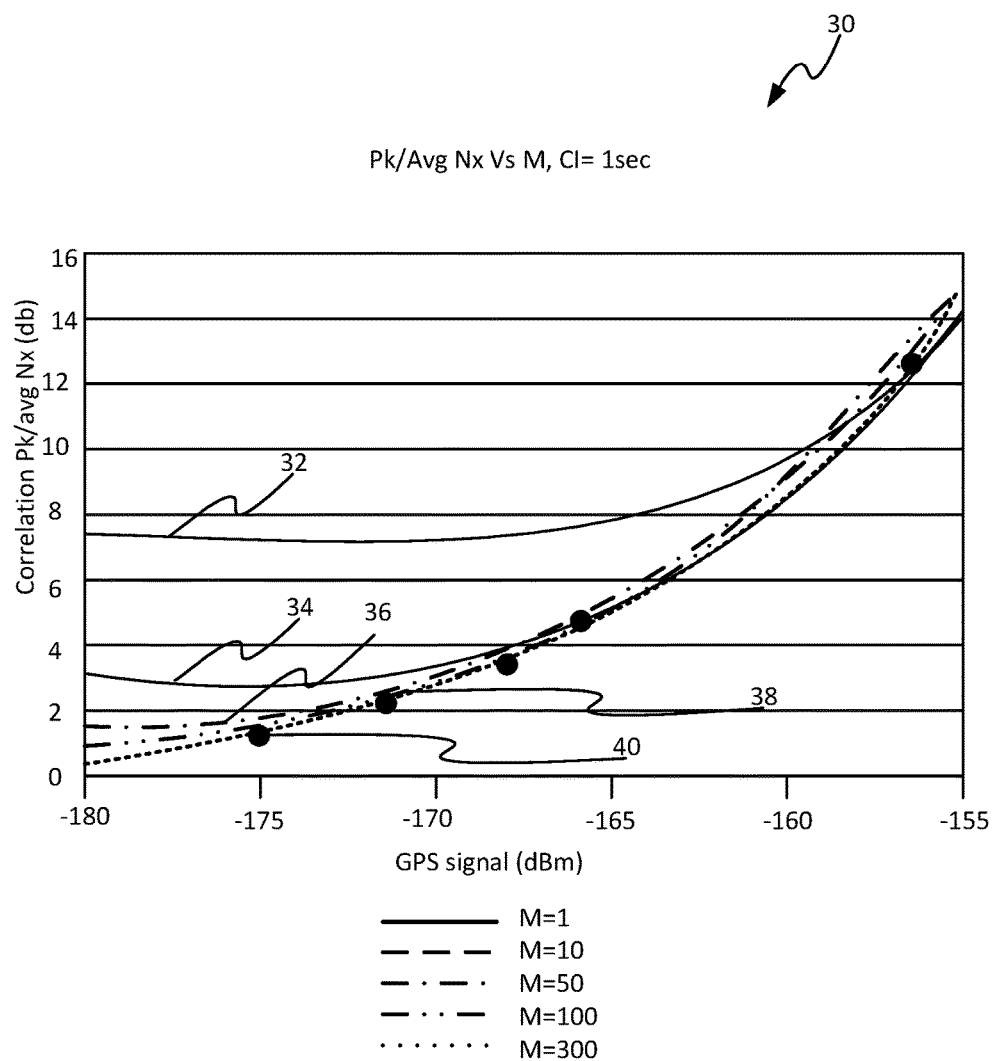
FIG. 2 depicts a plot representative of a plurality of threshold curves based on a predetermined threshold function relative to first signal characteristics.

For instance, as depicted in FIG. 2, a plot 30 is shown. The plot 30 may generally depict a plurality of threshold curves 32-40 that are representative of threshold functions that may be used to determine whether to decimate a second signal at a receiver. The plot 30 includes values related to the SNR for a signal on the vertical axis (e.g., as measured by the carrier power of a signal divided by the noise power, spectral density of the signal) as measured in decibels. The plot 30 may have values along the horizontal axis corresponding to the radio frequency power of a signal as measured in decibels.

In this regard, the plot 30 may be representative of various characteristics of the first signal. As described above, a predetermined threshold may be established. If the characteristics of the first signal satisfy the predetermined threshold, the second signal may be decimated. Also, as described above, the predetermined threshold may be based on a plurality of characteristics of the first signal. As such, the predetermined threshold may comprise a threshold function that is based on the plurality of characteristics of the first signal. For instance, the various threshold curves 32-40 may be representative of one or more threshold functions. Accordingly, measured or determined characteristics of a first signal that fall above (i.e., exceed) the threshold function may result in decimation of the second signal. Moreover, in addition to determining whether or not to apply decimation, various different threshold functions may be established that relate to different decimation values. For instance, at first predetermined threshold a first decimation value may be used such that every other portion of data may be removed from the second signal data. As described above, a data portion may be defined in a number of manners including specific sizes of data (measured in bits or the like) or a duration of data gathered (such as 1 ms blocks of data, 1 s blocks of data, or the like). Furthermore, the data portion size may correspond to the longest coherent integration period determined for a particular receiver. At a second, higher predetermined threshold a second decimation value may be used such that the decimation of the second signal is greater (e.g., every third data portion is retained, every fourth data portion is retained, etc.).

In one particular embodiment, one of the variables of the threshold function may relate to the number of non-coherent integrations performed to acquire the first signal. For instance, the various threshold curves 32-40 shown in the plot 30 may correspond to different respective numbers of non-coherent integration periods used to detect the first signal. For instance, threshold curve 32 may relate to a threshold in the case where a single coherent integration period is used. Threshold curve 34 may correspond to use of non-coherent integration of 10 coherent integration periods (i.e., 10 non-coherent integrations). In like fashion, threshold curve 36 may correspond to 50 non-coherent integrations, threshold curve 38 may correspond to 100 non-coherent integrations, and threshold curve 40 may correspond to 300 non-coherent integrations. Accordingly, in addition to the SNR represented on the vertical axis and the radio frequency power of the signal on the horizontal axis, a threshold for determining the decimation level of the second signal may also be used on the number of non-coherent integrations performed on the first signal.

Accordingly, in the specific embodiment depicted in FIG. 2, for a known number of non-coherent integrations of the first signal, a metric may be calculated to place the received first signal on the plot 30 to determine if the measured first signal SNR (vertical scale) and radio frequency power (horizontal scale) satisfies the appropriate threshold curve (e.g., lies above the appropriate respective curve in the plot 30) based on the number of non-coherent integrations. That is, the threshold function may be based at least on the SNR of the first signal, the RF power of the first signal, and the number of non-coherent integrations performed in acquiring the first signal. For example, for 300 non-coherent integrations, if the metric is higher than about 1 for ranges of radio frequency power between −180 dB and −170 dB (as seen relative to the threshold curve 40), it may be determined that the first signal satisfies the predetermined threshold. In turn, the second signal may be decimated based on the satisfaction of the threshold for the first signal.

In addition to use in determining the decimation level of the second signal, the foregoing approach to determining a threshold SNR relative to RF power may also provide a way to terminate the number of non-coherent integrations used. Specifically, for a given number of non-coherent integrations the metric for the signal using the given number of non-coherent integrations may be compared to the appropriate threshold curve such that the non-coherent integration of the signal may be stopped when the metric exceeds the appropriate threshold curve. If the metric does not exceed the threshold, additional non-coherent integration may be performed to increase the metric until it is satisfactory.

Returning to the approach for decimation of the second signal, once the metric that is calculated for the first signal is sufficient, the second signal may be decimated using an appropriate decimation level. For instance, rather than sending continuous data regarding the second signal (e.g., an L5 band signal including I5-code and Q5-code code data), a receiver may decimate (i.e., remove data from) the second signal. For instance, the receiver may utilize only every nth block of data (in which blocks or portions may be defined in any manner as described above). As such, the sensitivity of the signal that is decimated may also be reduced, yet the data bandwidth may also be significantly reduced (e.g., reduced by half, reduced to a third of the total signal, etc.). Despite the degradation in sensitivity, the sensitivity loss may not be significant if the radio frequency power level is high enough. In addition, in the case of the L5 band signal as the second signal, the accuracy of the system may also be improved due to the higher resolution in time of the L5 signal.

The advantage of use of such a decimation scheme, may be that there would be no sacrifice of post-processed accuracy in time or location using the decimated stream for the second signal. However, the receiver may still process first signal data normally (with a relatively low amount of computational capacity). The second signal data stream may then be processed using the decimated data stream locally at the receiver with more efficient processor use or may be transmitted via a network with efficient network bandwidth usage for processing of the second signal data remotely (e.g., anywhere in the cloud). In addition, when assuming a stationary receiver, a time spread acquisition may be performed wherein signals may be received at a receiver over a relatively large time span for use in processing of the signals. This differs from traditional processing that required instantaneous acquisition of signals in a common epoch. In turn, by having a time span (e.g., a 24 hour period) where decimated second signal data is streamed, more geometric diversity can be obtained.

Figure 3:
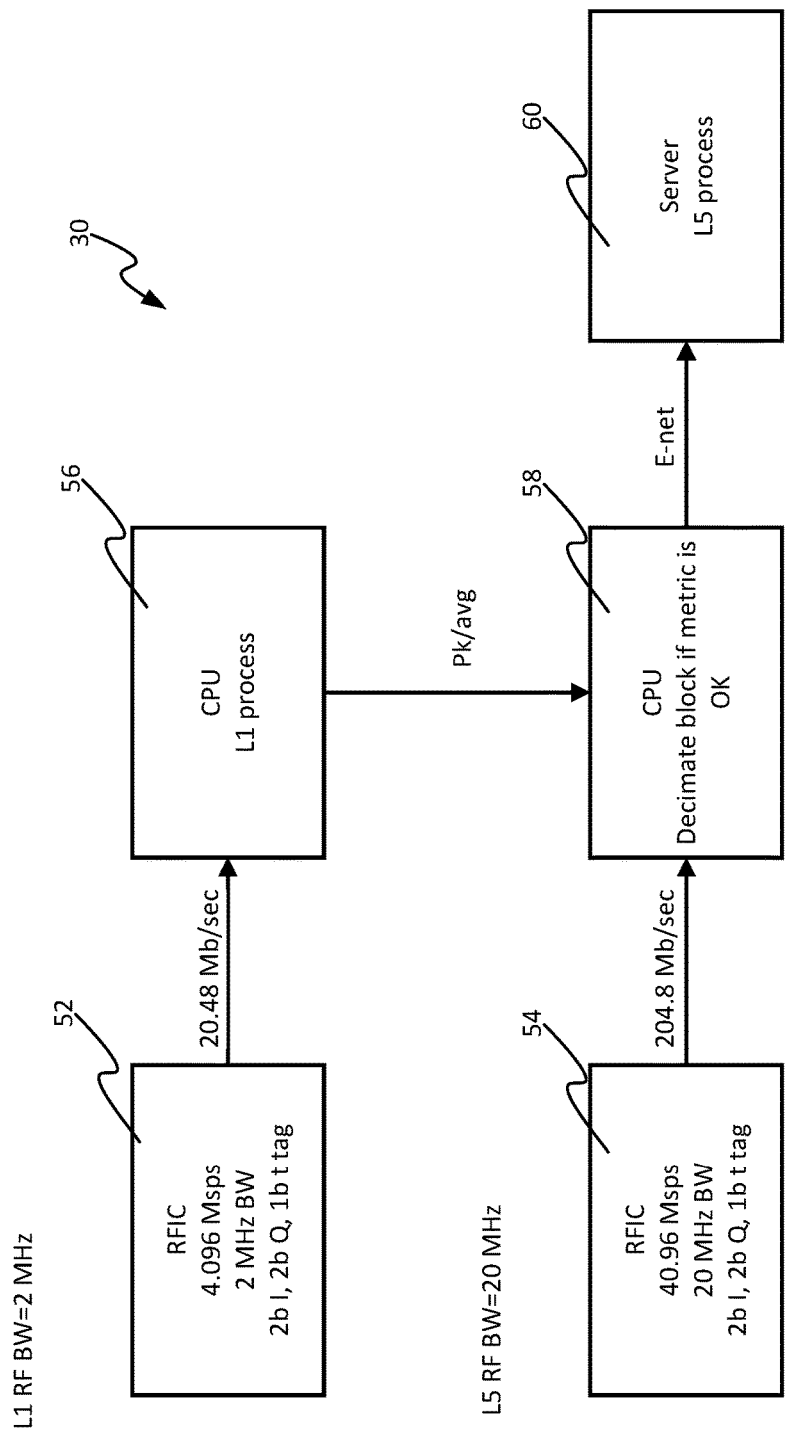
FIG. 3 depicts a schematic view of an embodiment of a system for decimation of a second signal in response to characteristics of a first signal.

FIG. 3 depicts a schematic of an embodiment of a system 50 that may be used to decimate a second signal data stream in response to measured characteristics of a first signal. The system 50 may include a first radio frequency integrated circuit (RFIC) 52 for reception of the first signal. In the embodiment depicted, the first signal may comprise a signal in the L1 GPS band. Accordingly, the first RFIC 52 may sample the first signal at a sampling rate of 4.096 megasamples per second (Msps), thus resulting in a data bandwidth of 20.48 Mb/s for the data comprising the first signal. This data at 20.48 Mb/s may be provided to a processor 56, which may calculate the metric as described above. In turn, the metric may be compared to the threshold curves 32-40 as shown in FIG. 2 to determine if the metric exceeds a threshold such that a second signal may be decimated.

In relation to the second signal, the system 50 may have a second RFIC 54 for reception of the second signal. In the example depicted, the second signal comprises an L5 band GPS signal. Given the higher encoded data rate, the second RFIC 54 may sample the second signal at 40.96 Msps (i.e., 10 times the rate of the first signal). In turn, the second RFIC 54 may output a data stream associated with data comprising the second signal at a data bandwidth of 204.8 Mb/sec. The data corresponding to the second signal may be received by a second processor 58 from the second RFIC 54. The second processor 58 may comprise a decimator that decimates the second signal.

Figure 4:
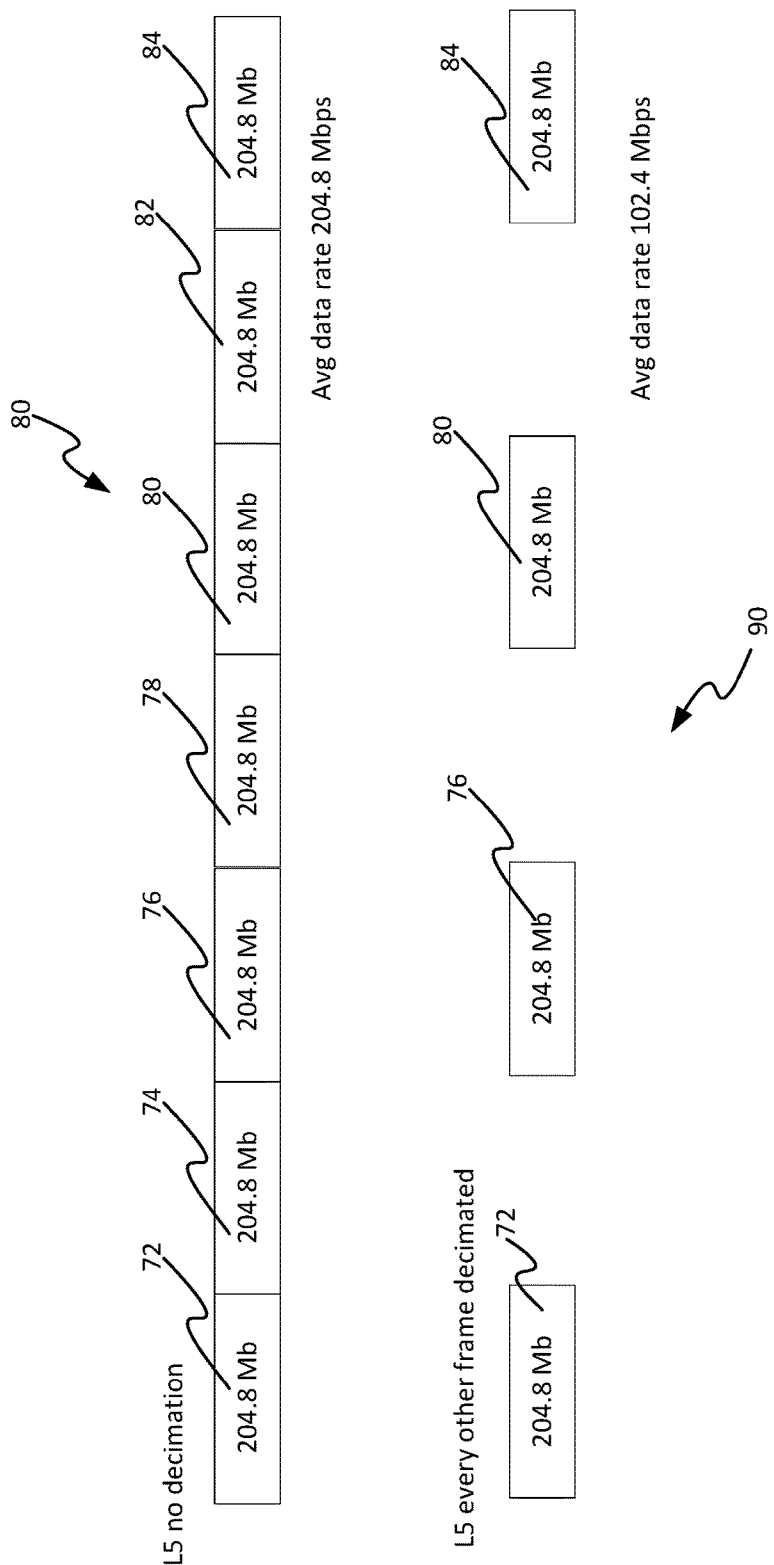
FIG. 4 depicts a schematic view of an embodiment of a data stream that is decimated according to the present disclosure.

Specifically, with further reference to FIG. 4, a first data stream 70 is represented as comprising a plurality of data frames 72-84. Each frame may comprise 204.8 Mb of data. As such, the average data rate of the first data stream 70 may be 204.8 Mbps. The second processor 58 may be operative to decimate the data stream to produce a second data stream 90. As shown, every other frame of data including only data frame 72, data frame 76, data frame 80, and data frame 84 remain in the second data stream 90. As the number of frames is reduced by half, so is the average data rate of the second data stream to 102.4 Mbps. In other embodiments, a different decimation value than every other frame may be used. For instance, every third data frame may be removed, every fourth data frame may be removed, etc. Alternatively, a higher decimation value may be applied such that every third data frame is maintained, every fourth data frame is maintained, and so on.

With return reference to FIG. 3, once the second signal is decimated, it may be provided for further processing by a location processor 60. The location processor 60 may be local to the receiver, in which case the reduced data bandwidth rate of the second signal may allow for reduced computational overhead. Alternatively, the location processor 60 may be remote from the receiver such that the decimated second signal at a reduced data bandwidth may be provided via communication over a network. In this case, the required network resources may be reduced to transmit the decimated second signal.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for processing signals received at a receiver capable of receiving signals broadcast from a positioning system transmitter, the method comprising:
   receiving first code signal data belonging to a first code signal at the receiver;
   determining a signal to noise ratio (SNR) for the first code signal data received at the receiver;
   comparing the SNR for the first code signal to an SNR threshold value;
   receiving second code signal data belonging to a second code signal at the receiver; and
   selecting a decimation level based on the comparison of the SNR for the first code signal to the SNR threshold value; and
   applying the decimation level to the second code signal data to generate decimated second code signal data.

2. The method of claim 1, wherein the decimation level reduces the data rate of the second code signal data when the SNR for the first code signal data is greater than the SNR threshold value.

3. The method of claim 2, wherein the decimation level does not reduce the data rate of the second code signal data when the SNR for the first code signal is less than the SNR threshold value.

4. The method of claim 1, wherein the SNR threshold value is at least in part based on the SNR and a measured power value of the first code signal data.

5. The method of claim 4, further comprising:
non-coherently integrating the first code signal data at the receiver over a number of non-coherent integrations;
wherein the SNR threshold value is at least in part based on the number of non-coherent integrations.

6. The method of claim 5, wherein the non-coherently integrating is repeated until the SNR threshold value is reached.

7. The method of claim 1, wherein the applying includes decimating a given number of data portions of the second code signal data, wherein the data portions correspond to a given period of data received at the receiver.

8. The method of claim 7, wherein the given period of data corresponds to a coherent integration period for the receiver.

9. The method of claim 1, wherein the first code signal data and the second code signal data are broadcast from a common positioning system transmitter.

10. The method of claim 9, wherein the first code signal data and the second code signal date are broadcast from a GNSS space vehicle.

11. The method of claim 10, wherein an encoded data rate of the second code signal is greater than the first signal.

12. The method of claim 11, wherein the first code signal data belonging to the first code signal is broadcast on a first frequency, and wherein the second code signal data belonging to the second code signal is broadcast on a second frequency.

13. The method of claim 12, wherein the first code signal data corresponds to an L1 signal of the GNSS space vehicle and the second code signal data corresponds to an L5 signal of the GNSS space vehicle.

14. The method of claim 1, further comprising:
calculating a position of the receiver at least in part based on the decimated second code signal data.

15. The method of claim 1, further comprising:
transmitting the decimated second code signal data to a remote processor for calculation of a position of the receiver at least in part based on the decimated second code signal.

16. An apparatus for receipt and processing of positioning system signals, the apparatus comprising:
a receiver for receipt of first code signal data belonging to a first code signal and second code signal data;
a memory that stores a signal to noise ratio (SNR) threshold value;
a processor in operative communication with the receiver and operative to calculate a signal to noise ratio (SNR) for the first code signal data and compare the SNR for the first code signal data to the SNR threshold value stored in the memory;
a decimator that is operative to decimate the second code signal data based on the comparison of the SNR for the first code signal data to the SNR threshold to generate decimated second code signal data, wherein the decimator reduces the data rate of the second code signal data when the SNR for the first code signal data is greater than the SNR threshold value and does not reduce the data rate of the second code signal data when the SNR for the first code signal data is less than the SNR threshold value.

17. The apparatus of claim 16, wherein the receiver is operative to measure a power value of the first code signal data received at the apparatus, and wherein the SNR threshold value is at least in part based on the power value of the first code signal data.

18. The apparatus of claim 17, further comprising:
a non-coherent integration module operative to non-coherently integrate the first code signal data over a number of non-coherent integrations;
wherein the SNR threshold value is at least in part based on the number of non-coherent integrations.

19. The apparatus of claim 16, wherein the first code signal data and the second code signal data are broadcast from a common positioning system transmitter comprising a GNSS space vehicle.

20. The apparatus of claim 19, wherein an encoded data rate of the second code signal is greater than the first signal, wherein the first code signal data belonging to the first code signal is broadcast at a first frequency and the second code signal data belonging to the second code signal is broadcast on a second frequency, and wherein the first code signal corresponds to an L1 signal of the GNSS space vehicle and the second code signal data corresponds to an L5 signal of the GNSS space vehicle.

* * * * *